United States Patent
De Loor et al.

(10) Patent No.: US 6,204,875 B1
(45) Date of Patent: *Mar. 20, 2001

(54) METHOD AND APPARATUS FOR LIGHT MODULATION AND EXPOSURE AT HIGH EXPOSURE LEVELS WITH HIGH RESOLUTION

(75) Inventors: Ronny A. De Loor, Ghent (BE); Dov Rosenfeld, Oakland, CA (US)

(73) Assignee: Barco Graphics, NV, Zwijnaarde (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 25 days.

(21) Appl. No.: 09/167,857

(22) Filed: Oct. 7, 1998

(51) Int. Cl.$^7$ ............................. B41J 15/14; B41J 27/00
(52) U.S. Cl. ................................. 347/241; 347/239
(58) Field of Search .................. 347/129, 239, 347/234, 235, 248, 250, 255, 256, 258, 231, 241; 359/623; 365/125; 219/121.83

(56) References Cited

U.S. PATENT DOCUMENTS

| | | | |
|---|---|---|---|
| 4,063,226 | * 12/1977 | Kozma et al. | 365/125 |
| 4,213,158 | 7/1980 | DeBenedictis | 358/296 |
| 4,357,627 | 11/1982 | Johnson | 358/348 |
| 4,577,932 | 3/1986 | Gelbart | 350/358 |
| 4,804,975 | 2/1989 | Yip | 346/76 |
| 4,978,974 | 12/1990 | Etzel | 346/107 |
| 5,049,901 | 9/1991 | Gelbart | 346/108 |
| 5,109,460 | 4/1992 | Baek et al. | 385/115 |
| 5,132,723 | 7/1992 | Gelbart | 355/40 |
| 5,196,949 | 3/1993 | Swanberg | 358/469 |
| 5,457,567 | 10/1995 | Shinohara | 359/305 |
| 5,517,359 | * 5/1996 | Gelbart | 359/623 |
| 5,521,748 | 5/1996 | Sarraf | 359/321 |
| 5,530,221 | * 6/1996 | Benda et al. | 219/121.83 |
| 5,612,767 | 3/1997 | Iwama | 399/98 |
| 5,745,153 | * 4/1998 | Kessler et al. | 347/241 |
| 5,808,657 | 9/1998 | Kurtz et al. | 347/239 |

FOREIGN PATENT DOCUMENTS

| | | | |
|---|---|---|---|
| 19724558 | 12/1997 | (DE) | B41J/2/455 |
| 91/8905 | 6/1991 | (WO) | B41J/2/52 |

\* cited by examiner

Primary Examiner—N. Le
Assistant Examiner—K. Feggins
(74) Attorney, Agent, or Firm—Dov Rosenfeld; Inventek

(57) ABSTRACT

A method and system for exposing a light sensitive material using device for forming a row of spots of light onto the light sensitive material located on a focal plane, device for modulating each of the spots according to imaging data so that at any point of time, the row of spots forms a data pattern according to the imaging data, device for generating relative motion between the imaging mechanism and the light sensitive material on the focal plane, the direction of motion substantially parallel to the direction of the row of spots on the light sensitive material; and data synchronizing device for shifting the imaging data into the modulating device at a rate determined by the speed of relative motion to maintain the image of any data pattern substantially stationary on the light sensitive material.

29 Claims, 6 Drawing Sheets

METHOD AND APPARATUS FOR LIGHT MODULATION AND EXPOSURE AT HIGH EXPOSURE LEVELS WITH HIGH RESOLUTION

FIELD OF INVENTION

This invention is related to optical output scanning and in particular to controlling exposure using extended light sources to achieve high resolution output at a high exposure level.

BACKGROUND TO THE INVENTION

Constructing a scanner with an extended light source such as an arc lamp or a high power laser diode or a laser diode array poses a difficult task for a designer. Because of the extended size of the source, it is impossible to collect all the light transmitted by the source into one or more small spots, for example of diameter on the order of 10 micrometers at a sufficiently high exposure level. Laser image recorders typically use lasers with a very well defined optical beam, for example, a low power laser diode, or a gas laser. Such laser diodes provide a high enough beam quality to be focused with high efficiency to a relatively small spot, and thus have been widely used in office laser printers and in the graphic arts industry.

For low sensitivity media printers such as a laser thermal printer, a higher power laser needs to be used to achieve a high throughput. $CO_2$ and Nd-Yag lasers do provide high, clean power with nearly Gaussian beams, and can be focused onto small spots with high efficiency, but these are extremely expensive. In addition, a Nd-Yag laser has a wavelength of 1064 nm, while for thermal imaging a lower wavelength, typically 830 nm, is preferred. The high power is of particular importance when writing on thermal materials such as thermal offset plates. In this type of material, heat is used to cross-link polymer chains. The cross-linked polymer is later used as the ink attracting layer (the printing layer) in an offset press. The necessary energy may not be applied in a very short time period (less than 100 ns) since this would ablate the polymer layer. This is in contradiction with modern fast imaging systems that expose more than 50 million pixels per second, which corresponds to only 20 nanoseconds per pixel.

Another type of material to which the present invention is applicable is for exposing liquid materials. For example, in stereo lithography, a laser scans the surface of a tank filled with a liquid. Upon receiving the laser light, this liquid polymerizes to solid form. The solid layer is then lowered into the liquid until the solid is covered by the liquid. A new laser scan will harden the next layer of material, and so on. The object material is thus built up layer by layer. In the future, it is envisaged that a liquid might be applied to a plate prior to exposure. During exposure, this liquid would cure on the imaged parts. The cured and non-cured parts would then be used for printing. This process is similar to a thermal transfer process wherein a layer from a donor sheet is transferred to a plate.

It is the object of the invention to present an imaging apparatus that delivers the power of an extended line source with high efficiency to a row of small pixels in a fixed array on the recording material. An example of a suitable light source is a high power laser diode, for example one with power of more than about 1 W. Another example is a laser diode array. The imaging system is set up such that the energy delivered to each pixel, and the shape of each pixel in a fixed array on the recording material is essentially the same.

A second object of the invention is to provide a method of applying high-energy exposure doses in fast image scanning systems. The resulting imaging system can provide the energy in an approximately 5 $\mu$s time interval despite the approximately 50 million pixels per second imaging rate.

A third object of the invention is to provide a means for altering the width of an imaged scan line. This enables changing the writing resolution of a scanning system without requiring sophisticated zoom optics. Such a variable resolution system enables higher imaging efficiency because the beam shape provided by the proposed method provides for a more rectangular profile. A rectangular profile is desirable when working with a binary material. With a Gaussian beam, only the center portion (that reaches the material threshold level) of the beam contributes to the image formation process. The portion of energy outside this center is lost.

RELATED METHODS AND SYSTEMS

Since it is physically impossible to focus all the light from a large light source onto one small pixel, one solution is to use a larger source and to consider the source as being made up of many smaller sources. The dimensions of these sources are chosen such that they can be imaged with high optical efficiency onto a small recording spot. For imaging, the recording device needs some means for modulating the intensity of the recording spot. Since the light source is spatially split up in many smaller sources ("sourcelets"), and each of these corresponds to a pixel, or a sub-pixel on the recording surface, a modulator means for each of these sourcelets would typically be necessary.

Several related devices have been described in the prior art. U.S. Pat. No. 4,577,932 to Gelbart (hereinafter: the "first Gelbart" system or method), describes using a multi-beam modulator in the form of an acousto-optic modulator in the scophony mode. The light of a laser diode is imaged on the acousto-optic modulator to form a line shape in the acoustical column. The acoustic wave in the acousto-optic modulator can be imaged onto the recording surface by freezing its motion. This is accomplished by operating the laser device in a pulsed mode at a rate synchronized with the acoustic wave speed. Thus, the laser diode is triggered to deliver a stroboscopic light flash. Because of the short duration of this light flash the modulated acoustic traveling wave can be frozen on the image plane. This first Gelbart method images the acousto-optic modulator such that a number of parallel tracks are written in the focal plane. This method has two main drawbacks. First, the optics that image the acoustic wave need to be of very high quality. The row of cells in the acoustic wave can be considered to be a linear array of pixels, and these have to be imaged onto the recording surface without distortion. If not, the size of the pixels in the focal plane will not be the same resulting in a "banding phenomena" well known in the graphic arts. A second drawback is that each of the pixels corresponds to a different spatial part of the source. Since the illumination of the source is not evenly distributed over its aperture, the intensity of each pixel in the corresponding trace on the recording surface may be different. This has dramatic effects on the image quality. Ideally, each of the spots in this kind of multi-beam scanner needs to have pixels of substantially the same intensity and of substantially the same shape. Also the spot location ideally needs to be within very narrow limits on the recording grid.

Another system described in U.S. Pat. No. 5,049,901, also to Gelbart (hereinafter the "second Gelbart" system or method), overcomes the intensity distribution problem by using a two-dimensional modulator device. The apparatus delivers a number of parallel traces equal to the number of columns in the two-dimensional modulator. During the recording surface scan, the image data is shifted through the columns of the device in synchronism with the recorder surface speed such that the modulating device maintains a stationary position relative to the fast recording movement. The intensity of each trace is calibrated by enabling a selected number of modulating channels in the modulator row, such that the summed intensity of all enabled channels is equal. Although this method overcomes the problem of calibrating channel intensities, it does so at the cost of efficiency. The system has to be set up such that the intensity of all channels equals the intensity of the least efficient one. Also, the system still requires a high quality imaging lens. That is, the location of the parallel tracks still needs to be substantially perfect.

Another system described in U.S. Pat. No. 5,517,359, also to Gelbart (hereinafter the "third Gelbart" system or method), uses the combination of a beam homogenizer and a linear multi-channel modulator. A laser diode is imaged onto the linear modulator using an intensity homogenizer. This optical device makes the intensity distribution on the modulator array quite uniform. A lens system images the transmitted light onto the recording surface. This system substantially overcomes the intensity calibration and efficiency problem in a multi track image recorder. However a high quality lens system is still required. The tracks need to be on the image grid and the total width of the number of tracks has to be equal to the nominal strip width. This is in general true for all multi-beam system with the array of spots orientated orthogonal to the scan line, including all three above-described Gelbart systems. To illustrate this disadvantage, consider a simple example. For a modulator with 400 channels, each corresponding to a recording pixel of 10 micrometer width, the width of the exposed image strip is 4 mm. A minor error of 2 to 3 micrometer in this 4000 micrometer wide strip would make the strip visible for the naked eye in the screened areas of a graphic arts recorded image.

Yet another method is described in U.S. Pat. No. 5,521,748 to Sarraf. This uses an alternate homogenizer to the third Gelbart system, and thus the same limitations apply to it as to the third Gelbart system.

U.S. Pat. No. 5,745,153 to Kessler et al. describes a system which uses a laser diode array to generate multiple beams, each diode in the array being directly modulated. Optical means, which include a lenslet array (one lenslet per diode in the laser diode array) and a field lens, direct the beams onto the plane of the entrance pupil of a printing lens which in turn images the set of beams efficiently onto a compact array of spots with the spacing between the spots less than the size of the spot. This system compacts an array of modulated sources to a spatially much smaller array. The quality and size of the individual spots depends directly on the beam quality of the individual laser sources in the array. High quality lasers do exist at power levels below 200 mW, so this does not offer a solution for when a higher power per spot, e.g., more than 1 W per spot, is required.

Thus there still is a need in the art for a method and apparatus for exposing a light sensitive material in high resolution with an extended light source.

SUMMARY

This and other objects are achieved in an apparatus and method described herein for recording an image, the apparatus including the following elements: means for forming a row of spots of light onto a light sensitive material located on a focal plane; means for modulating each of the spots according to imaging data so that at any point of time, the row of spots forms a data pattern according to the imaging data, means for generating relative motion between the row of spots of light and the light sensitive material on the focal plane, the direction of motion substantially parallel to the direction of the row of spots on the light sensitive material, the relative motion at a relative motion speed; and data synchronizing means for shifting the imaging data into the modulating means at a rate determined by the speed of relative motion to maintain the image of any data pattern substantially stationary on the light sensitive material.

In one set of embodiments, the modulating means and the means for forming the row of spots together include: an extended light source having a spatial extent; a multi-channel modulator containing a row of light modulating elements which receive the imaging data; illumination optics for illuminating the multichannel modulator with the output of the light source and configured to transform the light from the spatial extent of the source into a line shaped pattern on the modulator with the long dimension of the line shape substantially in the same direction as the direction of and covering the extent of the row of elements of the multi-channel light modulator; and imaging optics for imaging the multi-channel modulator output onto the light sensitive material to form the modulated row of spots on the light sensitive output. The modulating means is the coupling of the imaging data with the multi-channel light modulator.

In an alternate configuration, the means for forming the row of spots includes an array of light sources, for example, a laser diode array, to generate multiple beams and optical means which direct the beams efficiently onto a linear array of spots on the light sensitive material. The modulating means includes means for modulating each diode in the array separately so that the multiple beams are modulated according to the imaging data.

The means for providing the relative motion in one configuration includes means for scanning the modulated pattern across the light sensitive material on the focal plane, using, for example, a rotating polygon. In another configuration, the means for providing the relative motion moves the light sensitive material, for example on a rotating drum.

In each of these embodiments the combination is arranged such that the overall system overcomes the shortcomings of the prior art. For example, in the embodiment using a multi-channel modulator, there is no need to calibrate the intensity between the modulator channels, and the quality requirements of the imaging lens are relaxed from those of the above described Gelbart systems. Suitable sources for the multi-channel modulator versions include substantially line shaped sources of length expressed as a Lagrange product (also called a Lagrange invariant) of greater than about ten times the Lagrange product of a resolution element (a pixel) on the output plane, and 2D extended sources with a Lagrange product of more than about ten times that of the output plane pixel in the longitudinal direction and a Lagrange product of more than three times the output plane pixel Lagrange product in the other direction. Note that the Lagrange product (also called Lagrange invariant) is defined as the light sources "half-size" multiplied by the numerical aperture (expressed as an angle). In two-dimensions, the measure sometimes is called the "entendu" or "optical throughput" defined as the product of the area multiplied by the solid angle.

The apparatus of the present invention is especially useful in recording materials with low sensitivity and low ablation levels, such as thermal offset printing plate material. This type of material cannot be exposed at high speed in single beam systems. The very high required power density in the small scanning spot causes the sensitive layer to ablate, instead of changing the chemical or physical properties of the layer. The material needs to be written with a laser beam power density below the ablation threshold and yet above the imaging threshold energy. The current invention allows writing these materials at high scanning speeds, yet with a power density level well below the ablation threshold.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures.

DETAILED DESCRIPTION OF THE PREFERRED EMBODIMENTS

A Note on Reference Numerals

Figure 1:
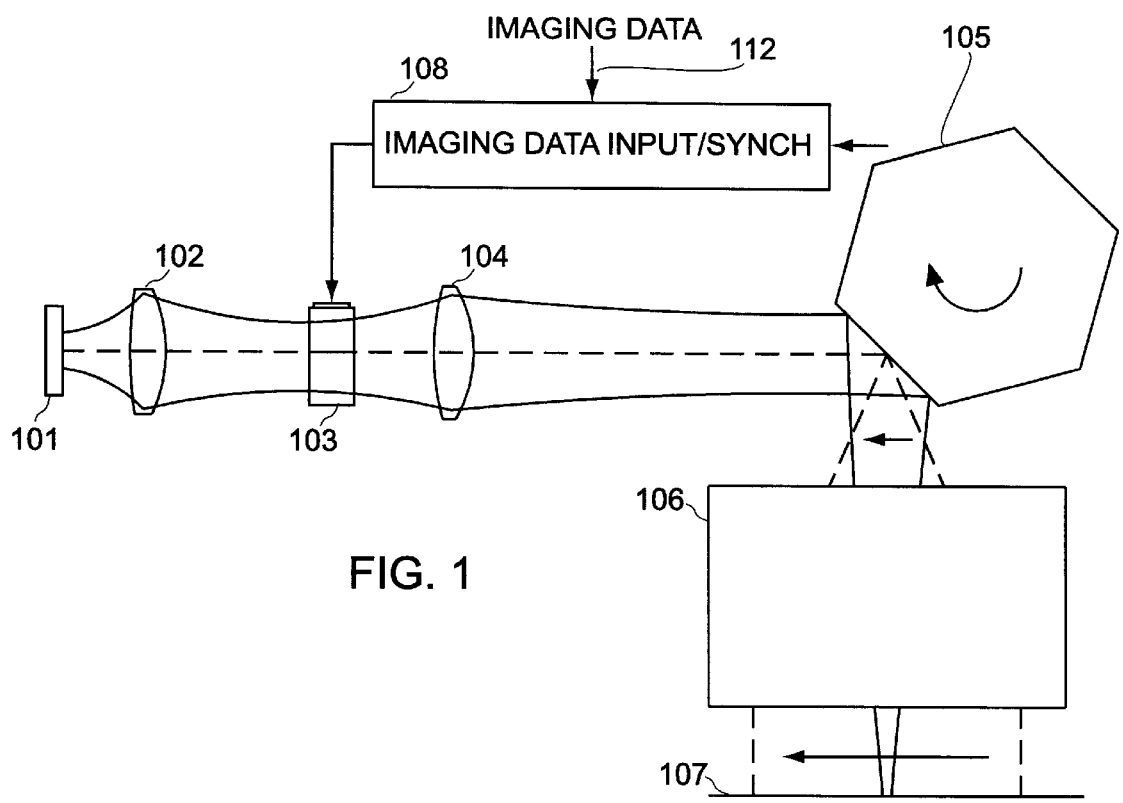
FIG. 1 shows the preferred embodiment of the system of the invention using a multi-channel modulator.

The first one or two digits in a reference numeral indicate on which figure that reference numeral is first introduced. Reference numerals between 100 and 199 are first introduced in FIG. 1, those between 200 and 299 are first introduced in FIG. 2, and so forth.

The Preferred Embodiments

Referring to FIG. 1, in one embodiment, the exposure system consists of a light source 101, a modulator subsystem 103, a scanning means 105 and a light sensitive material held on a focal plane 107.

Light source 101 in the preferred embodiment has an approximate line shape and could be, for example, a broad area laser diode which is a line shaped source that produces high beam quality in the direction perpendicular to the junction. In this direction, the source can be imaged onto a very narrow spot (in the order of 5 to 60 microns). In the direction parallel to the junction, on the other hand, it is not possible to focus all the available power onto a small spot. A broad area laser diode with a source dimension of 1 micron by 500 microns and full-width-half-maximum (FWHM) far-field angles of 36 degrees by 10 degrees can be easily imaged by a 4 times magnification system onto a 10 micron by 2000 micron line. Such a source is used in the preferred embodiment. In an alternate implementation, light source 101 could be composed of a set of smaller light sources arranged as a linear array, such as the source described in U.S. Pat. No. 5,521,748 to Sarraf, incorporated herein by reference. In addition to a single stripe laser diode, one might use a broad area laser diode or a multi-emitter laser diode.

Light source 101 illuminates a one-dimensional multi-channel light modulator 103 using an optic subsystem (illumination optics 102). Illuminating optics 102 forms a line shaped illuminating pattern substantially aligned along the modulator axis. The illuminating pattern, which covers the multiple channels of modulator 103, is formed from substantially the whole spatial extent of the light source. The modulator channels can selectively pass or stop portions of the light source illuminating pattern. Means 108 are provided for supplying imaging data 112 (typically in the form of pixel data) to multi-channel modulator 103. Illuminating optics 102 can take a variety of forms, from conventional discreet optics to binary optics to a combination thereof to achieve the desired illumination on the modulator. For example, a lenselet array may be used together with a field lens. See U.S. Pat. No. 5,521,748 to Kessler et al., incorporated herein by reference, for one description of such illumination optics. The illuminating pattern may be an image of light source 101 but is not necessarily so.

In some embodiments, the extended light source is extended in two dimensions rather than being a line source. With such a two-dimensional extended source, illuminating optics 102 could include a cylindrical lens to form a line shape, or a fiber optic bundle to convert the 2D-source shape into the line shaped illuminating pattern.

In another embodiment, the line shaped source is made up of a "point-like" source with a cylindrical lens that converts the laser output into a line source. Examples include a Nd-Yag or a Nd-YLF laser with a cylindrical lens.

Multi-channel modulator 103 also can take a variety of forms, including acousto-optic, liquid crystal, PLZT, electro-optic, magneto-optic, ferro-electric, digital mirror device and any other type which modulates the light through a set of linearly arranged modulator elements. Note that while an acousto-optic modulator does not strictly have distinct elements, the way it is used herein to shift a linear array of binary information means that in effect it operates as a multi-element modulator. All modulators that accept a row of information and modulate different areas of the modulator along the linear extent will thus be considered multi-channel modulators herein. The size and shape of each element is determined by the characteristics of the modulator, the characteristics of the image source, the desired pixel size, modulation rate and the desired focal plane scanning speed. The preferred embodiment uses a modulator with a number of light modulating cells in the order of approximately 20 to 400. By this is meant that a line of approximately 20 to 400 pixels is imaged onto the light sensitive material.

The image of the modulator plane—i.e., the plane where the modulating elements of modulator 103 are located—is scanned along a line on the light sensitive material on focal plane 107 by means of a scanning subsystem that provides relative motion between the image of light modulator 103 and the sensitized material on focal plane 107. The term "image of the output of modulator 103" will be used also to denote the image of the modulator plane. In the embodiment of FIG. 1, the scanning subsystem comprises some pre-scanner optics 104, a rotating polygon mirror 105 and post-scanner optics 106. The line shaped image of modulator 103 on the light sensitive material on focal plane 107 is oriented substantially along the scanned line. Since line shaped light source 101 is also oriented along the axis of modulator 103, the image of the light source is also oriented along the scanned line.

The scanning means therefore include imaging optics for imaging the light beams after passing through multi-channel modulator 103 onto the light sensitive material on focal plane 107, and means for providing relative motion between the material and the image of modulator 103 on the light sensitive material, the motion substantially parallel to the modulated line image of the output of the modulator on focal plane 107. The imaging optics provide magnification or de-magnification depending on the desired resolution on focal plane 107 and the size of each element of multi-channel modulator 103.

The combination of illuminating optics and imaging optics in one implementation, which includes the source being a line shaped source, images the source onto the output plane in one dimension, and images the output of the modulator in the other dimension. In the direction of the smaller source dimension (perpendicular to the scan line) the combination of optics systems 102, 104, 105 and 106 should image source 101 (line shaped in this case) on focal plane 107. In the longer source direction (along the scan line) it is only required that optics 104, 105 and 106 image the modulator 103 plane onto the focal plane 107. In the case that optic system 102 is anamorphic, source 101 is not "imaged" on the modulator 103, it illuminates the modulator. In the optical arts, the term "conjugate planes" is sometimes used to indicate that a plane is imaged onto another plane.

Denote by $V_s$ the speed at which the image of the output of modulator 103 illuminated by source 101 is moved by rotating polygon 105 along the scan line direction on focal plane 107. Assuming unity magnification, any pixel of the image of the modulator on the light sensitive material on focal plane 107 moves a distanced in time $d/V_s$. Thus, if L is the length of the line source (and assuming unity magnification), then a single pixel on the light sensitive material on focal plane 107 will be illuminated by the image of the source (with length L) during a time period called the dwell time and denoted by $t_d$, given by $$t_d = L/V_s \qquad \text{Eqn. (1)}$$

Note that this formula is easily appropriately modified to account for different magnifications. For example, if L is the length of the source referred to the modulator plane, and M is the magnification from the modulator plane to the focal plane, then $t_d = M \times L/V_s$. The apparatus and method of this embodiment allows the designer to choose any dwell time $t_d$, for example one optimized for the characteristics of the exposure medium, by selecting a suitable modulator and designing with a suitable magnification. Thus a pixel on the light sensitive material on focal plane 107 receiving light from one lengthwise extreme of the modulator will receive light from the other lengthwise extreme of the modulator one dwell time $t_d$ later. Since the linear extent of the modulator is illuminated by the spatial extent of the light source, each of the image pixel elements receive light from the whole spatial extent of the light source, not just from part of the source. This means that each pixel on the focal plane will receive substantially the same amount of light; the spatial intensity variation (for example, the intensity variation along the line of a line shaped source shown in FIG. 2B) being integrated over the length of source 101, totaling the intensity of the source. A second effect is, for a line shaped source, that any line width variations along the line image are also integrated for each pixel, resulting in pixels that all have the same energy distribution. A typical line width variation for a line shaped source is shown in FIG. 2C. This aspect of uniform pixels is a major advantage over multi-spot modulating systems that split the line source spatially, and write image tracks in parallel. In such prior art multi-spot modulating systems, one needs to control the intensity and energy distribution of each modulator channel in order to obtain pixels of equal energy distribution.

Figure 2A:
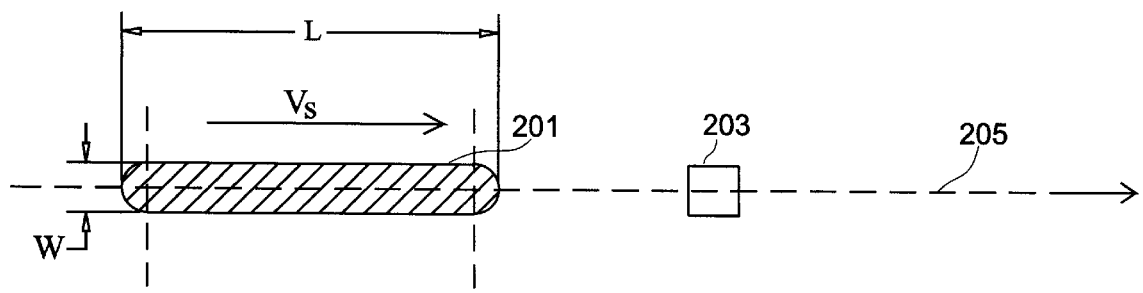
FIG. 2A shows the image of a source moving with velocity $V_s$ and a fixed pixel on a scan line on the focal plane.
Figure 2B:
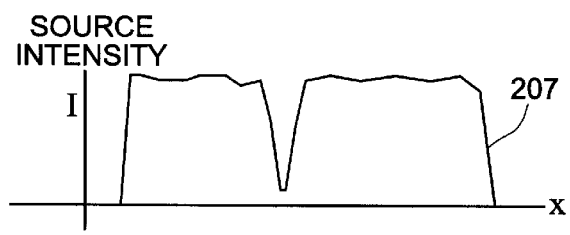
FIGS. 2B and 2C show a typical intensity and width distribution for a light source.
Figure 2C:
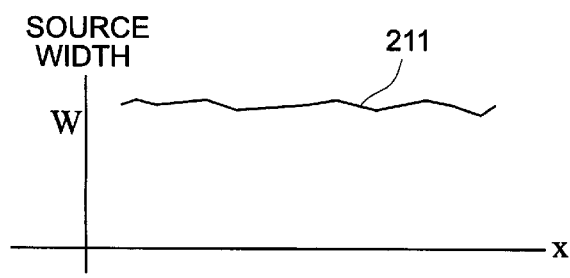
Figure 3A:
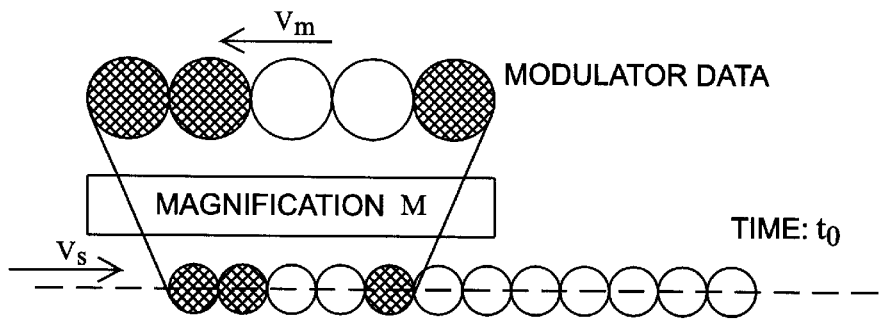
FIGS. 3A–3D show the image of the multi-channel modulator moving on the focal plane at four different points in time.
Figure 3B:
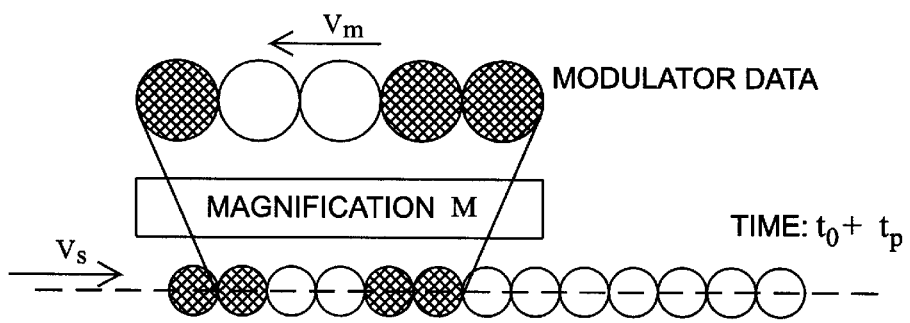
Figure 3C:
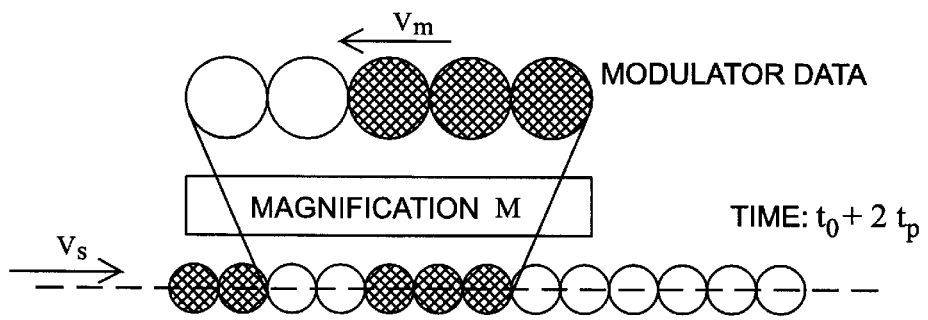
Figure 3D:
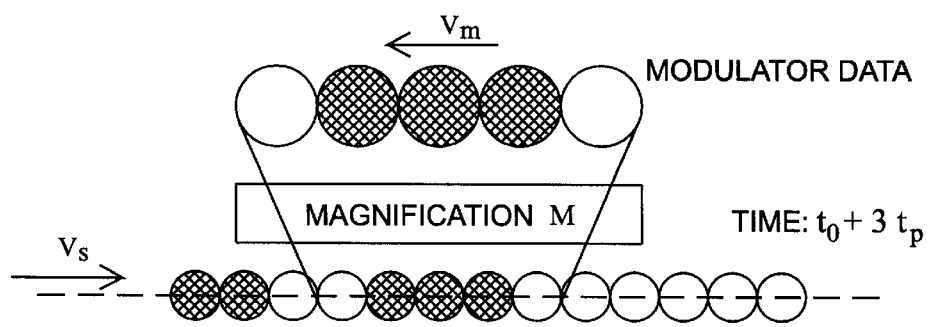

FIG. 2A shows an example of the image of the output of the modulator due to a line source 201 on the light sensitive material on focal plane 107 along the scan line direction 205. This image assumes all the channels of modulator 103 are open. Assuming unity magnification, image 201 has length L and moves at speed $V_s$. Assume that the illuminating pattern is an image of a line shaped source. The width is denoted by W. Also shown is a typical pixel 203. Practical line shaped sources have an intensity distribution which is not uniform, and such a typical distribution is shown in FIG. 2B, which shows how intensity I varies (curve 207) along length x. The width of a typical line-shaped source also is not uniform, and a distribution of width W along source length x is shown in FIG. 2C.

In the preferred embodiment of the present invention, multi-channel modulator 103 is used to modulate the image information with a resolution smaller than the length of the illuminating pattern on the modulator. The number of modulating channels n depends on the required image resolution as indicated by the number of pixels per unit length, denoted here by r in pixels per mm, and the length of the line source image, denoted by L' according to:

$$n = L' \times r \qquad \text{Eqn. (2)}$$

Over a period of time, any modulating pattern moves along the scan line. Each modulation pattern is kept for a period of $t_p$ and the modulation pattern on modulator 103 is shifted a pixel's distance (again assuming unity magnification) in synchronism with the scanning motion, but in reverse direction, so that over period of time, the modulation pattern remains at essentially the same position on the light sensitive material on focal plane 107. That is, the modulation pattern is prohibited of moving a distance longer than a pixel's distance on the focal plane.

So, at every time interval $t_p$ the data jumps back (shifts) in the modulator to catch up with the scan speed. That is, to resolve the image content on the light sensitive material on focal plane 107, the sequence of transferring imaging data 112 to the modulator by unit 108 is synchronized with the motion of the line image on the light sensitive material on focal plane 107. Thus unit 108 is an imaging data input and synchronization unit. Assuming the optical system has a magnification M=1 between the modulator and focal plane, it is sufficient to shift the modulation data at a speed, denoted $V_m$, along the modulator channels, given by:

$$V_m = -V_s.$$

The net result of the shifting operation freezes the image data spatially at the format plane. For non-unity magnification, say magnification M between the modulator and output plane, the shift speed in the modulator $V_m$ is given by:

$$V_m = -V_s/M. \quad \text{Eqn. (3)}$$

FIG. 3 illustrates this process. FIG. 3A is a snap shot of the modulator data and the line image at time $t_0$. FIG. 3B, 3C and 3D represent a snap shot of the modulator data and the exposed scan line at intervals of exactly one pixel time period, denoted $t_p$. This pixel period $t_p$ is the time during which the line image is moved over a one pixel distance in the focal plane 107, and is $$t_p = p/V_s, \quad \text{Eqn. (4)}$$

where the size of the pixel in mm is denoted by p and $V_s$ is the scan speed in mm per second on the focal plane.

It should be noted that it is not essential to shift the imaging data in the modulator at discrete pixel periods. Indeed during the time $t_p$, the data is fixed in position in the modulator. During this time $t_p$ the image pattern will move with respect of the output medium. An ideal pixel would write a dot with a triangular in-scan intensity profile, which slightly blurs the image. To get a better "more rectangular" pixel profile, the preferred embodiment uses a modulator that provides a multiple of modulator elements per pixel, say m elements per pixel. A modulator with m times n channels then needs to be shifted be at time intervals of $t_p/m$. The net effect of this higher update rate is a further reducing of the image smearing in the focal plane. When for example, a modulator with discrete pixels is used, the image of the modulator output is always moving a small amount with respect to the focal plane 107. At a predetermined time interval $t_p/m$, smaller than the pixel duration by factor m, the data is shifted through the modulator, this shift causing the image on the focal plane to jump back to where it was a time $t_p/m$ ago.

While the image of the modulator output is not stationary, with small sub pixel sized shift/jumps, we say that the image of the modulation pattern is "substantially" stationary during the complete line scan. That is, while the light beam is moving, the modulated data remains substantially stationary.

One particular embodiment of this invention uses an acousto-optic modulator. In this type of modulator, the modulation data physically moves at the speed of sound of the acousto-optic material. An acousto-optic modulator thus can be thought of as a continuous shift register of infinitely small modulating elements. A range of acousto-optic materials is available with a sound speed ranging from about 600 m/sec to about 4200 n/sec. By carefully matching the imaging system magnification M to the ratio of the scan speed $V_s$ to the acoustic speed, denoted $V_a$, a perfectly frozen line image can be obtained.

The acousto-optic modulator can be arranged so that only those portions of the crystal activated by the image data will result in light reaching the light sensitive material. Alternatively, in reverse mode, the acousto-optic modulator can be arranged so that only those portions of the crystal activated by the image data will result in the light of the activated pixels not reaching the material. In some cases, the reverse mode is preferred to the forward mode. For example, if a modulator can only deflect 80% of the incoming light, it is better to take away 80% of the light at the sensitive material. The only drawback is that the contrast is only 100% to 20%, or 5:1. When imaging thermal materials, since most such thermal materials do behave quite binary, this low contrast is in general not a problem.

Figure 4:
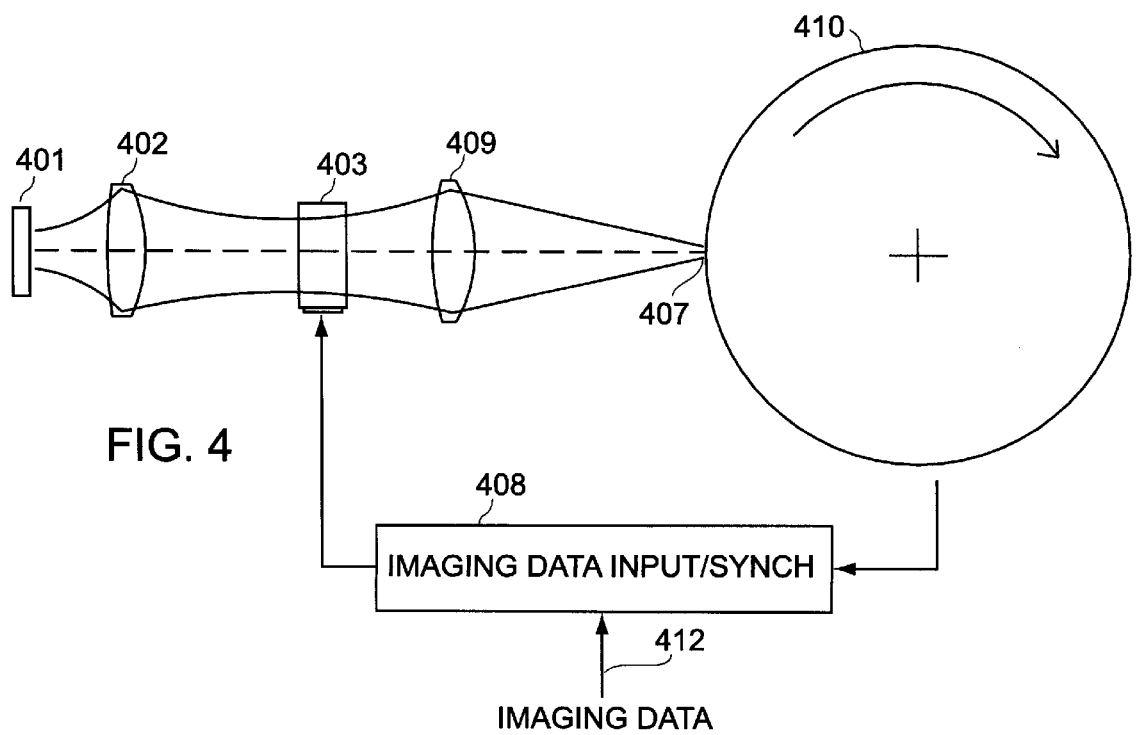
FIG. 4 shows an alternate embodiment of the invention using a multi-channel modulator and a rotating drum to provide relative motion.

FIG. 4 shows an alternate embodiment of the present invention. In this system the scanning motion is provided by wrapping the material around a drum 410. The drum rotation speed provides the fast scanning motion. As in the former embodiment, an extended light source 401 (e.g., a line shaped source) illuminates linear multi-channel modulator 403 with a line shaped illuminating pattern formed by illumination optics 402. Means 408 are provided for inputting imaging data 412 into the linear multichannel modulator. The output of the modulator is imaged onto the rotating drum 410 by imaging optics 409 along the scanned line at the focal plane 407 on which the light sensitive material is held. The surface speed of the drum at the focal plane is denoted by $V_s$, the magnification of the imaging optics 409 is denoted by M. The input unit 408 also includes data synchronization means and shifts imaging data 412 through the linear modulator 403 at a speed, denoted $V_m$, and determined according to Eqn. (3).

Other methods also are possible for providing the relative motion between the image of the multi-element modulator and the light sensitive medium on the focal plane, including without limitation using a moving mirror, a moving hologram, or a linear transport. It would be clear to one of ordinary skill in the art that other methods of providing relative motion also may be adapted for this application.

The multi-channel modulator (103 and 403, respectively), in each of the above embodiments is a transmission type in that light is the transmittive property of each channel that is modified by modulation. Either embodiment (FIG. 1 or FIG. 4) may also be modified to use a reflective multi-channel modulator. The mechanism for generating pixels is the same except that light is reflected rather than transmitted from each channel in the multi-channel modulator. In case a row of controlled deformable mirrors is used, the imaging system of the light modulator is done in a way that either only those mirrors activated by the image data will result in light reaching the light sensitive material, or, in reverse mode, the light of the activated pixels not reaching the material. As discussed above for acousto-optic modulators, in some cases, the reverse mode is preferred to the forward mode. See aforementioned incorporated-by-reference U.S. Pat. No. 5,521,748 to Sarraf for a description using a reflective multi-channel modulator and an optical system incorporating such a modulator. The Sarraf system, which solves different problems, includes means for providing relative motion perpendicular rather than parallel to the direction of the line source image, and does not include the data synchronization means. How to modify the Sarraf embodiments to be within the scope of the present invention would be clear to one of ordinary skill in the art.

An additional aspect of the invention is the incorporation of line width alignment. Line width alignment helps optimize the image quality when exposing different light sensitive materials. It is also important for exposure equipment that exposes images at different resolutions. Traditionally, line width is changed by modifying the scanning spot width.

This typically is done by aperturizing the laser beam, or by using optical zoom means. Aperturizing is simple, but the available energy in the spot is reduced, for example by a factor four when the spot is doubled in size. This is a major drawback since switching to larger spot size typically is done to raise the imaging speed, and imaging at higher speeds needs more light energy. The other traditional method is using a high quality, fast zoom system, and this raises the cost and complexity of the optical system considerably.

Binary materials, such as thermal offset plates (e.g. the Kodak Direct Image Thermal Plates made by the Eastman Kodak Company of Rochester, N.Y.), only image the middle track of each scan line where the energy reaches the threshold level. For diffraction limited optics, one can model the spot energy distribution in several ways, including for example as an Airy profile or as a Gaussian beam profile (see J. W. Goodman, *An Introduction to Fourier Optics*, 2nd ed., New York: McGraw-Hill, 1996). It would be clear to those in the art that not all the energy in the slopes of the profile contributes to the imaging process. Given a particular amount of laser power, a more rectangular spot profile enables one to image materials with a higher energy threshold. In practice, it is not possible to produce a perfect rectangular, or top hat energy distribution. For laser spots of about 10 micrometer at a wavelength of 830 nm, this ideal can only be approximated, for example by using very fast optics. Very fast optics have the drawback that they have a very small focal depth, in some cases fast autofocus objective elements are needed to guarantee the required image quality.

Figure 5A:
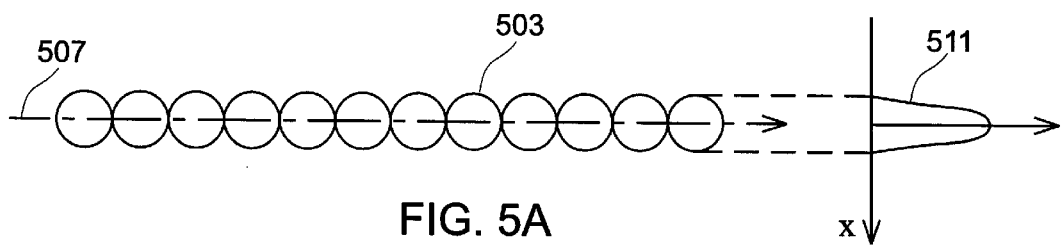
FIGS. 5A and 5B show the aspect of the invention in which slightly rotating the source image and the multi-channel modulator relative to the scanning direction provides variable width on the output plane.
Figure 5B:
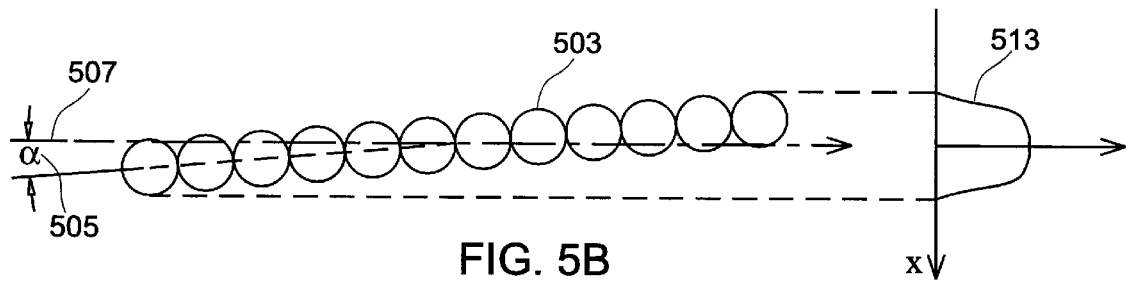

In the embodiment of the present invention, which includes line width alignment, means are provided for slightly rotating the image of the modulated illumination pattern on the light sensitive medium output with respect to the scanned line. As illustrated in FIG. 5A and FIG. 5B, if one rotates the modulated illumination pattern 503 (illumination from the light source) by a small angle 505 (denoted a) with respect to the scanned line 507, the scan line energy distribution becomes more rectangular. For each pixel element on the format plane, the illumination pattern image is apparently moving in a direction perpendicular to the scanned line during the passage of the line shaped illumination pattern profile. Since the modulation data is stationary with respect to the light sensitive material, and wince each pixel on the format integrates intensity over the full light source extent, the energy distribution profile for each pixel element is the same.

FIG. 5A is un-rotated, giving distribution 511, while FIG. 5B shows the rotation, leading to distribution 513.

Figure 6:
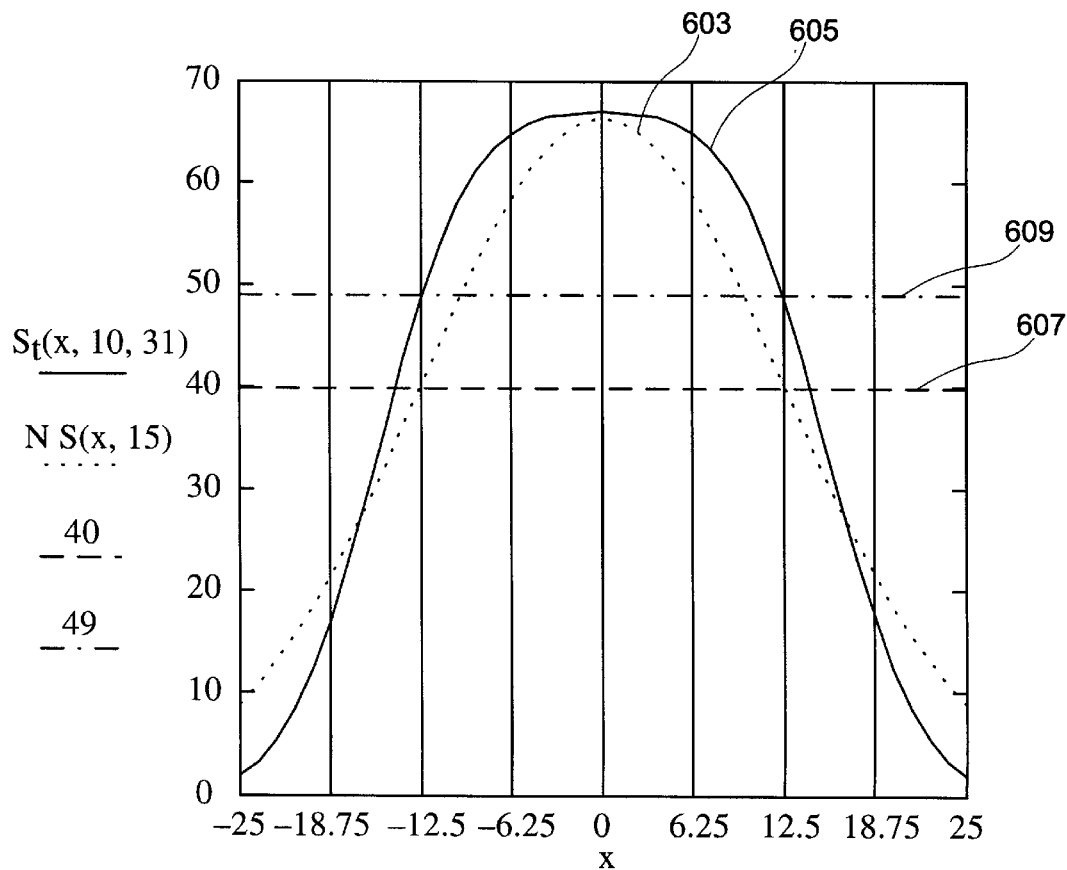
FIG. 6 shows the performance obtained using the line-width adjustment aspect of the invention.

FIG. 6 illustrates the benefits of this scan line width alignment means. The dotted curve 603 is the energy profile of a Gaussian laser beam. With this profile we can image a 25 micrometer wide line on a binary material with a threshold level of 40 units (shown as 607). The same energy focused in a Gaussian profile of half the size, but a line source tilt of 31 micrometer is able to image the same line width on a material with a threshold of 49 units. The profile is shown by solid curve 605, and the threshold as 609. This is a 25 percent improvement. Note also the higher slope on solid curve 605. For non-binary threshold materials, this results in a higher edge sharpness. In the preferred embodiment, source 101, optics 102 and modulator 103 are mechanically rotated around the optical axis. Other means for rotating would be clear to one of ordinary skill in the art. For example, only rotating source 101 and optics 102 would work as long as the illuminating slanted line on the modulator from the source is not aperturized. Alternatively an image rotator (like a dove prism) could be entered in the optical path. Note that the rotation angle a is small, up to about 6 degrees.

The direction of relative motion of the multi-channel modulator output image with respect to the light sensitive medium on the focal plane is thus still substantially parallel to the direction of the row of light modulating elements on the output image.

Alternate embodiments

The various embodiments of the system described above may be generalized to include the following elements: means for imaging a row of spots onto a light sensitive material located on a focal plane; means for modulating each of the spots according to imaging data so that at any point of time, the row of spots forms a data pattern according to the imaging data, means for generating relative motion between the row of spots and the light sensitive material on the focal plane, the direction of motion substantially parallel to the direction of the row of spots on the light sensitive material, the relative motion at a relative motion speed; and data synchronizing means for shifting the imaging data into the modulating means at a rate determined by the speed of relative motion to maintain the image of any data pattern substantially stationary on the light sensitive material.

In the various above described embodiments, the modulating means and the means for forming the row of spots together include: an extended light source having a spatial extent; a multi-channel modulator containing a row of light modulating elements which receive the imaging data; illumination optics for illuminating the multi-channel modulator with the output of the light source and configured to transform the light from the spatial extent of the source into a line shaped pattern on the modulator with the long dimension of the line shape substantially in the same direction as the direction of and covering the extent of the row of elements of the multi-channel light modulator; and imaging optics for imaging the multi-channel modulator output onto the light sensitive material to form the modulated row of spots on the light sensitive output. The modulating means is the coupling of the imaging data with the multi-channel light modulator.

Figure 7:
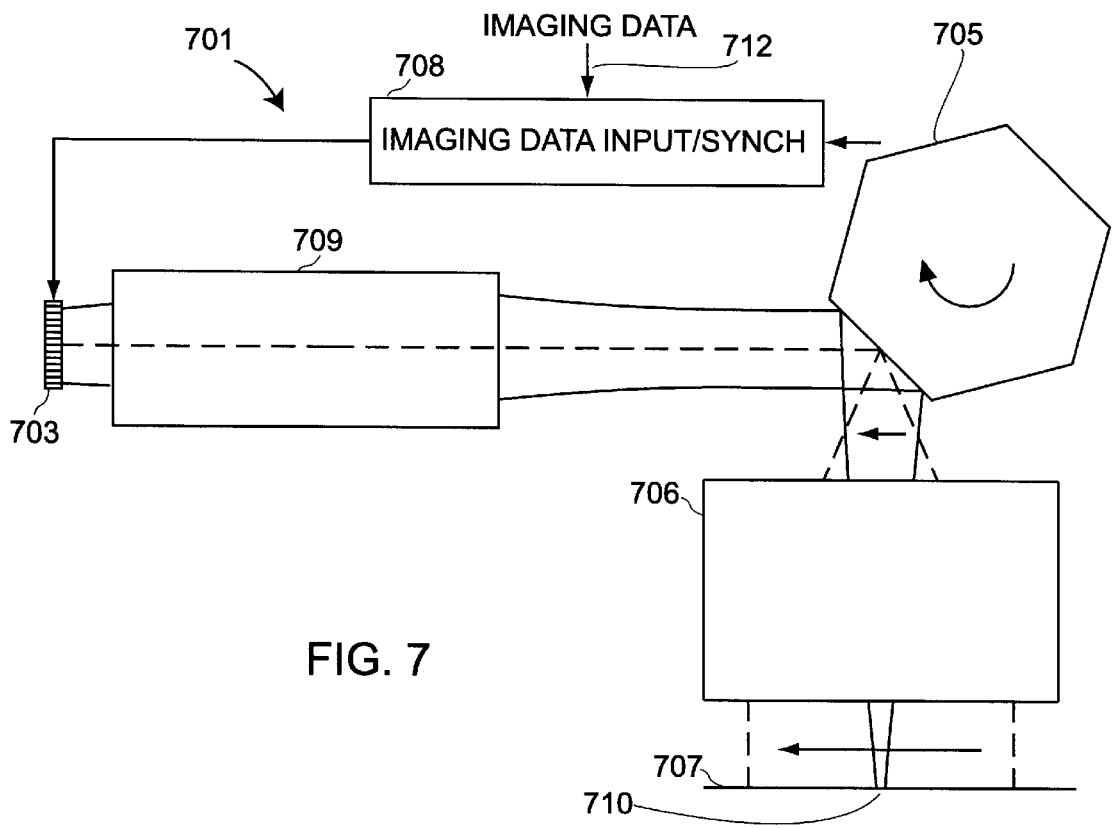
FIG. 7 shows one embodiment of the system of the invention using an array of individually modulated sources.
Figure 8:
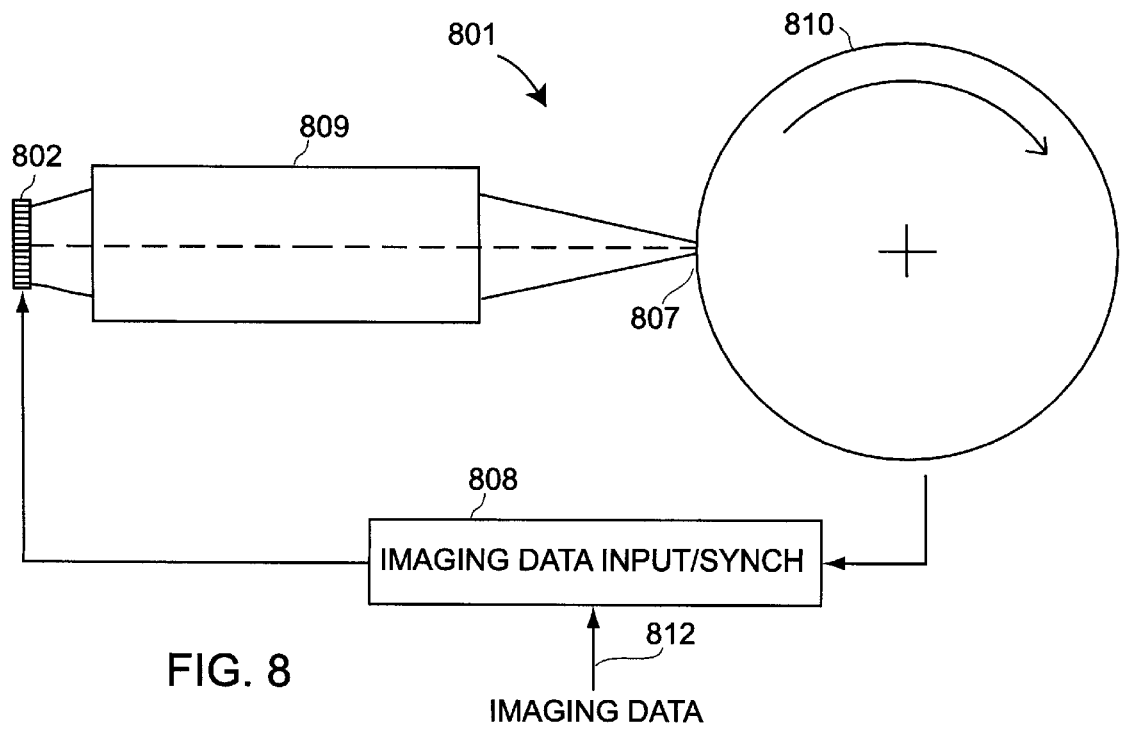
FIG. 8 shows an alternate embodiment of the invention using an array of individually modulated sources and a rotating drum to provide relative motion.

In an alternate configuration, the means for forming the row of spots includes a laser diode array to generate multiple beams and optical means which direct the beams efficiently onto a linear array of spots on the light sensitive material. The modulating means includes means for modulating each diode in the array separately so that the multiple beams are modulated according to the imaging data. Several configurations are possible. FIG. 7 shows one configuration 701 which is analogous to the configuration of FIG. 1 and where the means for providing the relative motion comprises means for scanning the modulated pattern 710 across the light sensitive material 707 on the focal plane, using, for example, a rotating polygon 705, while FIG. 8 shows a second configuration which is analogous to that of FIG. 4 and where the means for providing the relative motion moves the light sensitive material, for example on a rotating drum 810. The system shown in FIG. 7 includes a first set of optics 709 for imaging the output of the array of modulated sources 703 onto means for providing a scanning set of beams, which in this case includes a rotating polygon 705, but which may alternatively use holographic scanning means, and imaging optics 706 for forming the array of modulated spots 710, the imaging optics, as in the case of the system of FIG. 1, including all the necessary optics to translate the rotating motion into a linear scanning motion. The imaging data 712 modulates array 703, and driver unit 708 includes means to shift the data through the source array 703 in a synchronous manner dependent on the speed of rotation of polygon 705 so that the image consisting of the modulated set of spots 710 on the light sensitive material on the focal plane remains substantially stationary with respect to the material 707. System 801 shown in FIG. 8 on the other hand includes optics 809 for imaging the output of the array of modulated sources 802 onto the light sensitive material on drum 810 to form an array of modulated spots 807. Imaging data 812 modulates array 802, and driver unit 808 includes means to shift the data through the source array 802 in a synchronous manner dependent on the speed of rotation of drum 810 so that the image consisting of the modulated set of spots 807 on the light sensitive material on the focal plane remains substantially stationary with respect to the material.

Figure 9:
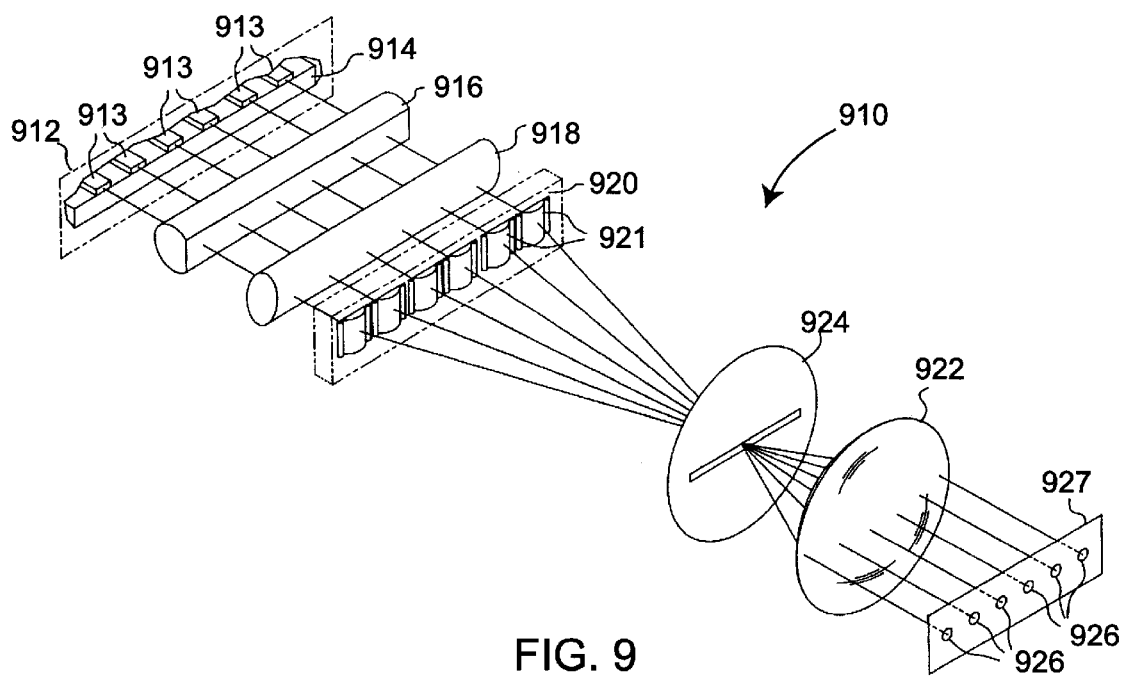
FIG. 9 is a view in perspective of an optical arrangement for use with a laser diode array in which the diodes are individually modulated according to another aspect of the invention.

FIG. 9 shows a view in perspective of an optical arrangement 910 which can be used in either embodiment 701 of FIG. 7 or 801 of FIG. 8. FIG. 9 is adapted from above-mentioned incorporated-by-reference U.S. Pat. No. 5,745,153 to Kessler et al., FIG. 9 does not show the means for providing the relative motion nor the means for synchronizing modulation of the light sources. How to incorporate these elements into the arrangement shown in FIG. 9 would be clear to one of ordinary skill in the art. Laser diode array 912 (shown within a dashed-line rectangle) is a laser diode array comprising a plurality of diode lasers 913 formed on a substrate 914. Each diode in the array is separately modulated. The optical means for imaging the array comprises a first cylinder lens 916, a second cylinder lens 918, a micro lenslet array 920 of one lenslet 921 per source 913, and a printing lens 922. The laser diode array 912 comprises a number of independently modulated laser diode sources 913. While it is advantageous to have a large number of diodes 913 in laser diode array 912, since the size of the laser diode array 912 is limited typically to approximately twelve millimeters, having a large number of independent light sources results in the light sources being too closely spaced which causes unwanted cross-talk. The cross-talk is in the form of electrical, thermal, and possible optical cross-talk which causes one channel to affect the other. Therefore, to avoid cross-talk, the laser diode array 912 has, for example, a total size in the array direction of twelve millimeters and comprises between ten to two hundred independently modulated light sources with distances therebetween of approximately 1000 to 50 microns, respectively.

Micro-optics are used with laser diode array 912 of independently modulated diode lasers 913. The micro-optics in combination with other lenses in accordance with this embodiment of the present invention provide an efficient transformation of light from the diode lasers 913 to a modulated line of printing spots 926 at a light sensitive media 927.

In optical arrangement 910, the diverging modulated light beams with predetermined intensities from the laser diodes 913 of the laser diode array 912 are intercepted by the first cylinder lens 916 having a first high numerical aperture (NA). Although the first lens is designated a cylinder lens, it is to be understood that the first lens 916 can have cylinder surfaces or a hyperbolic surface. The second cylinder lens 918 is positioned in the direction of a width of the laser diode array 912 (e.g., along the line of diode lasers 913) to further modify the light beams from laser diode array 912 and focus the substantially parallel light beams leaving the first cylinder lens 916 on a plane close to the entrance pupil 924 of the printing lens 922. The entrance pupil 924 is located in a front focal plane of the printing lens 922. The lenslet array 920 of individual lenslets 921 intercepts the light beams from the second cylinder lens 918, and focuses and overlaps each of the light beams from the lasers 913 at the entrance pupil 924 in the direction of the laser diode array 912. The printing lens 922 then images the laser diode array 912 represented by the light beams at the entrance pupil 924 onto the light sensitive media 927 to form a line of closely spaced spots 926 of predetermined intensities. The required exposure energy is provided by shifting the imaging data through the diode array so that the pattern formed by modulated spots 926 is substantially stationary with respect to the light sensitive material 927. Note again that FIG. 9 does not show the means for providing the relative motion between the modulated beams hitting the light sensitive material and the light sensitive material itself, which, in the case of embodiment 701 of FIG. 7, is provided by moving the beams, and in the case of embodiment 801 of FIG. 8, is provided by moving the light sensitive material.

Other arrangements clearly are possible for the means for imaging the row of spots onto the light sensitive material. See for example, U.S. Pat. No. 4,804,975 to Yip, incorporated herein by reference, which is for a thermal dye transfer apparatus application, and U.S. Pat. No. 5,109,460 to Baek et al, also incorporated herein by reference, which describes an optical fiber array for a thermal printer. Neither of these systems includes the data synchronizing means, and are for applications that have different accuracy and resolution requirements. How to modify these to be included in embodiments of the present invention would be clear to one of ordinary skill in the art.

As will be understood by those of ordinary skilled in the art, many changes in the methods and apparatuses as described above may be made without departing from the spirit and scope of the invention. Variations include, without limitation, using different means to achieve the illumination, using different means to achieve the relative motion, synchronizing means, different multi-channel modulators means for those embodiments that use a multi-channel modulator, different light sources, and different light sensitive media. The scope of the invention is limited only by the claims attached hereto and legal equivalents thereof.

What is claimed is:

1. A light modulation and exposure system for exposing imaging data including:
   (a) an extended light source having a spatial extent;
   (b) a light sensitive material located on a focal plane;
   (c) a multi-channel light modulator containing a row of light modulating elements;
   (d) illumination optics for illuminating the multi-channel light modulator with the output of the light source, the illumination optics configured to transform light from the spatial extent of the light source into a line shaped pattern on the light modulator with the long dimension of the line shape substantially in the same direction as the direction of and covering the extent of the row of elements of the multi-channel light modulator;
   (e) imaging optics for imaging the multi-channel light modulator output onto the light sensitive material on the focal plane to form an image of a row of modulated elements;
   (f) means for generating relative motion between the multi-channel light modulator and the light sensitive material on the focal plane, the direction of relative motion substantially parallel to the direction of the row of elements in the image of the row of light modulating cells on the light sensitive material, the relative motion at a relative motion speed; and (g) data synchronizing means for shifting the imaging data into the row of elements of the multi-channel modulator at a shifting speed determined by the speed of relative motion with the shifting speed referred to the focal plane equal to and in opposite direction to the relative motion speed, such that the image of any data pattern produced in the output of the multi-channel modulator is maintained substantially stationary on the light sensitive material to prohibit the data pattern from moving on the light sensitive material in the direction of the row of elements a distance more than the distance between modulated elements in the image of the row of modulated elements.

2. The light modulation and exposure system as described in claim 1 wherein the multi-channel light modulator includes at least 20 light modulating cells.

3. The light modulation and exposure system as described in claim 1 wherein the longer dimension of the spatial extent of the light source has a Lagrange product at least ten times the Lagrange product of a resolution element in the focal plane.

4. The light modulation and exposure system as described in claim 1 wherein the linear modulator is one of:
   (i) a liquid crystal type;
   (ii) a PLZT type
   (iii) a magneto-optic type;
   (iv) a ferro-electric type;
   (v) an electro-optic type;
   (vi) a row of controlled deformable mirrors; and
   (vii) an acousto-optic modulator.

5. The light modulation and exposure system as described in claim 1 wherein the means of generating relative motion includes:
   (i) a rotating polygon mirror;
   (ii) a moving mirror;
   (iii) a moving hologram;
   (iv) a rotating drum; or
   (v) a linear transport.

6. The light modulation and exposure system as described in claim 5 wherein the light sensitive material is a thermal printing plate.

7. The light modulation and exposure system as described in claim 5 wherein the light sensitive material is in liquid form.

8. The light modulation and exposure system as described in claim 1, further including:
   means for rotating the image of the light source to make a small angle with the direction of the motion.

9. The light modulation and exposure system as described in claim 1 wherein the light source has substantially a line shape.

10. The light modulation and exposure system as described in claim 9 wherein the light source is one of:
    (i) a broad area laser diode of linear dimension less than one 1 mm;
    (ii) a very wide area laser diode of linear dimension larger than one 1 mm;
    (iii) a multi-emitter laser diode;
    (iv) a linear array of laser diodes;
    (v) an arc lamp;
    (vi) a Nd-Yag laser with a cylinder lens to form a line shaped illumination area;
    (vii) a Nd-YLF laser with a cylinder lens to form a line shaped illumination area; and
    (viii) a point source with a cylinder lens to form the illuminating line.

11. The light modulation and exposure system as described claim 1 wherein the light source is one of:
    (i) a 2D array of laser diodes;
    (ii) a broad 2D area laser diode; and
    (iii) a stack of line diodes.

12. A light modulation and exposure system for exposing imaging data including:
    (a) means for forming a row of spots of light onto a light sensitive material located on a focal plane;
    (b) means for modulating each of the spots according to the imaging data so that at any point of time, the row of spots forms a data pattern according to the imaging data;
    (c) means for generating relative motion between the row of spots and the light sensitive material on the focal plane, the direction of relative motion substantially parallel to the direction of the row of spots on the light sensitive material, the relative motion at a relative motion speed; and
    (d) data synchronizing means for shifting the imaging data into the modulating means at a shifting speed determined by the speed of relative motion and causing the data pattern to shift in the opposite direction to the direction of the relative motion such that the image of any data pattern produced in the output of the multi-channel modulator is maintained substantially stationary on the light sensitive material to prohibit the data pattern from moving a distance on the light sensitive material more than the distance between spots in the row of spots.

13. The light modulation and exposure system as described in claim 12 wherein the modulating means includes:
    a multi-channel modulator containing a row of light modulating elements which receive the imaging data,
    and wherein the means for forming the row of spots includes:
    an extended light source having a spatial extent;
    illumination optics for illuminating the multi-channel modulator with the output of the light source and configured to transform light from the spatial extent of the source into a line shaped pattern on the modulator with the long dimension of the line shape substantially in the same direction as the direction of and covering the extent of the row of elements of the multi-channel light modulator; and
    imaging optics for imaging the multi-channel modulator output onto the light sensitive material to form the modulated row of spots on the light sensitive output.

14. The light modulation and exposure system as described in claim 12 wherein the means for forming the row of spots includes:
    an array of light sources to generate multiple beams, and
    optical means which direct the beams onto a linear array of spots on the light sensitive material,
    and wherein the modulating means includes:
    means for modulating each light source in the array separately so that the multiple beams are modulated according to the imaging data.

15. The light modulation and exposure system as described in claim 14 wherein the means of generating relative motion includes:

(i) a rotating polygon mirror;
(ii) a moving mirror;
(iii) a moving hologram;
(iv) a rotating drum; or
(v) a linear transport.

16. The light modulation and exposure system as described in claim 15, further including:
   means for rotating the image of the light source to make a small angle with the direction of the motion.

17. The light modulation and exposure system as described in claim 15 wherein the array of light sources is an array of laser diodes.

18. The light modulation and exposure system as described in claim 17 wherein the optical means includes a array of lenslets, the lenslet array comprising one lenslet per laser diode.

19. A method for exposing a light sensitive material according to imaging data, the method comprising:
   (a) placing the light sensitive material onto a focal plane area
   (b) illuminating a multi-channel light modulator containing a row of light modulating elements with an extended light source, the illuminating being through illumination optics configured to transform light from the spatial extent of the light source into a line shaped pattern on the light modulator with the long dimension of the line shape substantially in the same direction as the direction of and covering the extent of the row of elements of the multi-channel light modulator;
   (c) imaging the multi-channel light modulator output onto the light sensitive material on the focal plane using imaging optics;
   (d) generating relative motion between the multi-channel light modulator and the light sensitive material on the focal plane, the direction of relative motion substantially parallel to the direction of the row of elements in the image of the row of light modulating cells on the light sensitive material, the relative motion at a relative motion speed; and
   (e) shifting the imaging data into the row of elements of the multi-channel modulator at a shifting speed determined by the speed of relative motion with the shifting speed referred to the focal plane equal to and in opposite direction to the relative motion speed, such that the image of any data pattern produced in the output of the multi-channel modulator substantially stationary on the light sensitive material to prohibit the data pattern from moving on the light sensitive material in the direction of the row of elements a distance more than the distance between modulated elements in the image of the row of modulated elements.

20. The exposing method as described in claim 19, the method further including rotating the image of the modulator output to make a small angle with the direction of relative motion.

21. The exposing method as described in claim 19 wherein the extended light source has substantially a line shape.

22. The exposing method as described in claim 21 wherein the light source is one of:
   (i) a line shaped broad area laser diode of linear dimension less than one 1 mm;
   (ii) a line shaped very wide area laser diode of linear dimension larger than one 1 mm;
   (iii) a multi-emitter laser diode;
   (iv) a linear array of laser diodes;
   (v) an arc lamp;
   (vi) a Nd-Yag laser with a cylinder lens to form a line shaped illumination area;
   (vii) a Nd-YLF laser with a cylinder lens to form a line shaped illumination area; and
   (viii) a point source with a cylinder lens to form the illuminating line.

23. The exposing method as described in claim 19 wherein the longer dimension of the spatial extent of the light source has a Lagrange product of at least ten times the Lagrange product of a resolution element in the focal plane.

24. The exposing method as described in claim 19 wherein the linear modulator is one of:
   (i) a liquid crystal type;
   (ii) a PLZT type;
   (iii) a magneto-optic type;
   (iv) a ferro-electric type;
   (v) an electro-optic type;
   (vi) a row of controlled deformable mirrors; and
   (vii) an acousto-optic modulator.

25. The exposing method as described in claim 19 wherein the generating relative motion uses one of:
   (i) a rotating polygon mirror;
   (ii) a moving mirror;
   (iii) a moving hologram;
   (iv) a rotating drum; and
   (v) a linear transport.

26. The exposing method as described in claim 19 wherein the light sensitive material is a thermal printing plate.

27. A method for exposing a light sensitive material according to imaging data, the method comprising:
   (a) forming a row of spots of light onto a light sensitive material located on a focal plane;
   (b) modulating each of the spots according to the imaging data so that at any point of time, the row of spots forms a data pattern according to the imaging data, the modulating using modulating means;
   (c) generating relative motion between the row of spots and the light sensitive material on the focal plane, the direction of relative motion substantially parallel to the direction of the row of spots on the light sensitive material, the relative motion at a relative motion speed; and
   (d) shifting the imaging data into the modulating means at a shifting speed determined by the speed of relative motion to cause the data pattern to shift in the opposite direction to the direction of the relative motion such that the image of any data pattern produced in the output of the multi-channel modulator is maintained substantially stationary on the light sensitive material to prohibit the data pattern from moving a distance on the light sensitive material more than the distance between spots in the row of spots.

28. The light exposing method as described in claim 27 wherein the step of modulating includes:
   receiving the imaging data in a multi-channel modulator containing a row of light modulating elements; and
   and wherein the step of forming the row of spots of light includes:
   illuminating the multi-channel modulator with the output of an extended light source having a spatial extent by transforming light from the spatial extent of the source into a line shaped pattern on the modulator with the long dimension of the line shape substantially in the same direction as the direction of and covering the extent of the row of elements of the multi-channel light modulator; and imaging the multi-channel modulator output onto the light sensitive material to form the modulated row of spots on the light sensitive output.

29. The light exposing method as described in claim 27, wherein the step of forming the row of spots of light includes:

directing multiple beams generated from an array of light sources onto a linear array of spots on the light sensitive material, and wherein the modulating step includes:

modulating each light source in the array separately so that the multiple beams are modulated according to the imaging data.

* * * * *

UNITED STATES PATENT AND TRADEMARK OFFICE
CERTIFICATE OF CORRECTION

PATENT NO. : 6,204,875 B1  Page 1 of 1
APPLICATION NO. : 09/167857
DATED : March 20, 2001
INVENTOR(S) : De Loor et al.

It is certified that error appears in the above-identified patent and that said Letters Patent is hereby corrected as shown below:

In column 15, line 25 (the 2$^{nd}$ line of claim 4), kindly change "linear modulator" to --light modulator--.

In column 16, line 6 (the 2$^{nd}$ line of claim 11), kindly change "claim 1" to --in claim 1--.

In column 16, lines 29-30 (the 20$^{th}$-21$^{st}$ of claim 12), kindly change "multi-channel modulator" to --modulating means--.

In column 18, line 14 (the 2$^{nd}$ line of claim 24), kindly change "linear modulator" to --light modulator--.

In column 18, line 55 (the 20$^{th}$ line of claim 27), kindly change "multi-channel modulator" to --modulating--.

Signed and Sealed this

Sixth Day of November, 2007

JON W. DUDAS
*Director of the United States Patent and Trademark Office*